United States Patent [19]

Fine

[11] Patent Number: 4,973,565
[45] Date of Patent: Nov. 27, 1990

[54] FLUOROBOROSILICATE GLASS AND CLAD ARTICLE

[75] Inventor: Gerald J. Fine, Corning, N.Y.

[73] Assignee: Corning Incorporated, Corning, N.Y.

[21] Appl. No.: 380,376

[22] Filed: Jul. 17, 1989

[51] Int. Cl.⁵ ............................................ C03C 3/115
[52] U.S. Cl. ..................................... 501/58; 501/57; 501/59; 501/75; 501/900; 501/903
[58] Field of Search ..................... 501/58, 59, 74, 900, 501/903, 905, 75; 428/374, 384, 387

[56] References Cited

U.S. PATENT DOCUMENTS

| | | | |
|---|---|---|---|
| 2,407,874 | 9/1946 | Fraser | 106/52 |
| 3,764,354 | 10/1973 | Ritze et al. | 106/54 |
| 3,784,386 | 1/1974 | Arauto et al. | 106/50 |
| 4,721,690 | 1/1988 | Ross et al. | 501/60 |
| 4,768,859 | 9/1988 | Kasori et al. | 350/96.34 |
| 4,792,535 | 12/1988 | Fine | 501/66 |

FOREIGN PATENT DOCUMENTS 2714713  4/1977  Fed. Rep. of Germany ........ 501/74

Primary Examiner—Mark L. Bell
Assistant Examiner—Chris Gallo
Attorney, Agent, or Firm—Milton M. Peterson; Clinton S. Janes

[57] ABSTRACT

There are disclosed fluoroborosilicate glasses that are particularly adapted to being drawn with lead silicate core glasses to produce clad glass fibers useful in forming fiber optic bundles to be incorporated in night vision equipment. The cladding glass has a refractive index not over about 1.465 and a coefficient of thermal expansion not over about $80 \times 10^{-7}/°C$. The clad fiber has a numerical aperture approximating or equal to one.

12 Claims, 1 Drawing Sheet

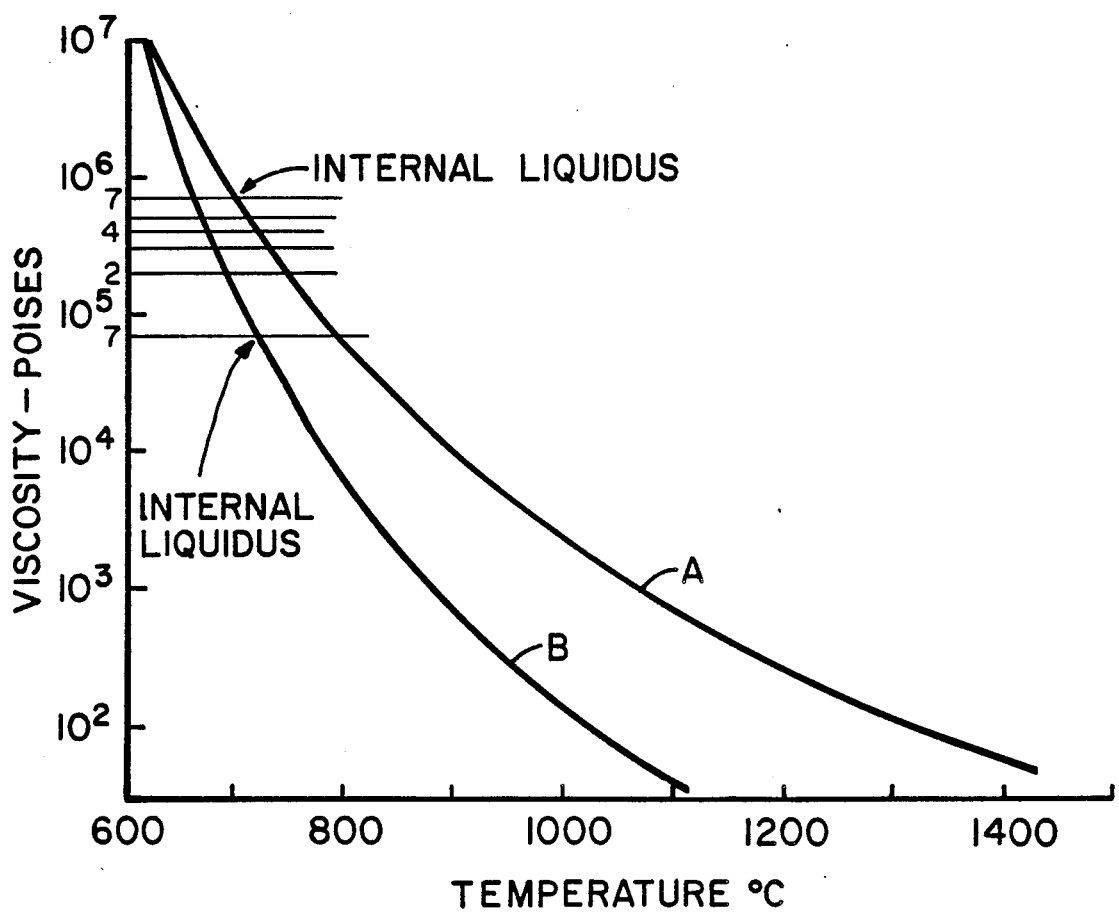

FLUOROBOROSILICATE GLASS AND CLAD ARTICLE

INTRODUCTION

This invention is concerned with fluoroborosilicate glasses having physical properties that particularly adapt them to use as cladding glasses for clad glass fibers. A specific application is the production of fiber optic bundles for use as optical elements in night vision equipment.

These fiber optic bundles are composed of clad fibers having a high numerical aperture (N.A.), wherein the value of N.A. approaches, and desirably is equal to, one. Numerical aperture is a function of the refractive indices of two glasses employed as core and cladding glasses in an optical fiber. It is defined by the equation $$N.A. = (N_1{}^2 - N_2{}^2)^{\frac{1}{2}}$$

where $N_1$ and $N_2$ are the refractive indices of the core and cladding glasses, respectively.

It is immediately apparent that, in order to obtain a high numerical aperture, glasses having widely divergent refractive indices must be employed. However, consideration must also be given to a number of other physical properties as well. Thus, to form a strong clad fiber, free from such flaws as cracks, striae, crystals and seeds, the core and cladding glasses must be compatible during sealing, redrawing and cooling steps. This means that consideration must be given to such properties as coefficient of thermal expansion, glass softening point, phase separation tendency, glass viscosity and devitrification tendency.

It has been the practice, heretofore, to produce fiber optic bundles for night vision equipment by a multiple step process. A suitable core glass is cast into circular bars, and a cladding glass is drawn as tubing. A bar is then placed inside a length of tubing, and the glasses are drawn as clad cane or fiber. Lengths of these clad fibers are packed into bundles and redrawn again. After the redraw step is repeated again, a number of the resulting bundles are fused together under applied pressure to form a block. Either faceplates or image inverters are then cut from the block and polished on either end for use in night vision goggles. In this final form, a faceplate or inverter consists of thousands of fibers, each on the order of microns in diameter.

My U.S. Pat. No. 4,868,141 discloses a family of fluoroborosilicate glasses. These glasses are particularly adapted to inclusion in a fiber optic bundle as cladding glasses for clad glass fibers. This glass family has composition ranges which, in weight percent, consist essentially of 35–52% $SiO_2$, 8–23% $Al_2O_3$m, the $SiO_2+Al_2O_3$ being at least 53%, 10–23% $B_2O_3$, 15–19% $K_2O$, the $B_2O_3+Al_2O_3$ being not over 36%, 0–8% $Na_2O$, 0–5% alkaline earth metal oxides (RO) and containing, by analysis, 6–12% F. The glasses have refractive indices not over about 1.45 and linear coefficients of thermal expansion not over about $120\times10^{-7}/°C$. A particular feature of these glasses is their capability to be drawn, in conjunction with a high lead silicate glass, directly from melts as clad fiber having a numerical aperture equal to or approximating one.

The families of glasses described in my pending application generally provided the properties and capabilities required for successfully direct-drawing clad fibers having the desired high numerical aperture. However, problems arose in developing commercial processing procedures for the production of such products as night vision devices. In particular, it was ascertained that the mechanical strength was marginal. As a result, there was a tendency for fibers to break unless handled very carefully.

PURPOSES

A basic purpose then is to provide clad glass fibers of the nature and properties described in my prior application, but having increased mechanical strength.

A further purpose is to provide a novel family of fluoroborosilicate glasses having thermal coefficients of expansion below $80\times10^{-7}/°C$. and refractive indices below 1.465.

Another purpose is to provide a family of cladding glasses having properties such that clad fibers can be drawn directly from adjacent glass melts.

A still further purpose is to provide a family of fluoroborosilicate cladding glasses that are compatible with lead silicate core glasses having high refractive indices.

Yet another purpose is to provide clad glass fibers having flexural strengths on the order of 20 ksi or greater.

SUMMARY OF THE INVENTION

In furtherance of these and other apparent purposes, one aspect of my invention is a family of fluoroborosilicate glasses having compositions which, in weight percent, consist essentially of 48–55% $SiO_2$, 7–12% $Al_2O_3$, over 23%, but not over 28% $B_2O_3$, 7–9% $Na_2O$, 0–2.5% $K_2O$, and containing, as batched, 6–10% F. The glasses have refractive indices not over about 1.465 and linear coefficients of thermal expansion not over about $80\times10^{-7}/°C$. Arsenic and antimony oxides may be present in amounts up to 2% for fining purposes. However, $Li_2O$, alkaline earth metal oxides (RO) and refractory oxides, such as $ZrO_2$, should be avoided.

Another aspect of my invention is a clad fiber, having a numerical aperture equal to or approximating one, wherein the cladding glass is a fluoroborosilicate having a composition that, in weight percent, consists essentially of 48–55% $SiO_2$, 7–12% $Al_2O_3$, over 23%, but not over 28% $B_2O_3$, 7–9% $Na_2O$, 0–2.5% $K_2O$ and containing, as batched, 6–10% F. The glass has a refractive index not over about 1.465 and a coefficient of thermal expansion not over about $80\times10^{-7}/°C$.

The core glass may be a lead silicate glass having a refractive index of at least 1.76. Lead silicate glasses particularly suitable as core glasses consist essentially of, in percent by weight, 63–72% PbO, 26–32% $SiO_2$, 0–6% BaO, the PbO+BaO content being 66–72%, 0–2% CaO, the BaO +CaO being 0–6%, 0–5% $Al_2O_3$, 0–5% $Na_2O$, 0–3% $K_2O$, and 0–2% of $As_2O_3$, the glass having a refractive index of 1.76–1.78.

The invention further contemplates a night vision device embodying a fiber optic bundle composed of clad fibers wherein the cladding glass is a composition that, in weight percent, consists essentially of 48–55% $SiO_2$, 7–12% $Al_2O_3$, over 23%, but not over 28% $B_2O_3$, 7–9% $Na_2O$, 0–2.5% $K_2O$ and containing, as batched, 6–10% F. The glass has a refractive index not over about 1.465 and a coefficient of thermal expansion not over about $80\times10^{-7}/°C$.

PRIOR LITERATURE

An article by Fraser and Upton, in the *Journal of the American Ceramic Society*, 27, 121-128 (1944) and entitled "Optical Fluor-Crown Glasses", reports studies on the effect of composition variations on optical properties of glasses used in optical elements. The composition components varied were silica, alumina, boric oxide, potash and fluorine.

U.S. Pat. No. 2,407,874 (Fraser) discloses fluor-crown optical glasses containing silica, alumina, boric oxide, alkali metal oxide and fluorine.

U.S. Pat. No. 2,433,882 (Armistead) discloses glasses colored green with cobalt and iron halides, containing oxides of silicon, boron, aluminum and sodium and/or potassium, and having a minor addition of fluoride.

U.S. Pat. No. 3,671,380 (Ali et al.) discloses cladding glasses for clad fibers. The cladding glasses have relatively low refractive indices and are composed of $B_2O_3$, $SiO_2$, $Al_2O_3$ and $K_2O$.

U.S. Pat. No. 3,764,354 (Ritze) discloses fluoroborosilicate glasses having low refractive indices and optical paths independent of temperature. The glasses consist essentially of $SiO_2$, $B_2O_3$, $Al_2O_3$, alkali oxide plus fluoride, $Sb_2O_3$ and additional fluorine.

U.S. Pat. No. 4,102,693 (Owen et al.) discloses photochromic borosilicate glasses having dispersed silver halide crystals and composed of $SiO_2$, $B_2O_3$, $Al_2O_3$ and alkali metal oxide ($R_2O$).

BRIEF DESCRIPTION OF THE DRAWING

The single FIGURE in the accompanying drawing is a graphical representation of the viscosity-temperature curves for typical cladding and core glasses in accordance with the invention.

GENERAL DESCRIPTION

It is well known that the strength of a clad glass body may be enhanced if an expansion mismatch occurs between the glasses as the body cools. The mismatch must be such that the expansion, or actually the shrinkage on cooling, is greater in the glass that forms the interior portion of the body.

The significant mismatch occurs between the set point of the softer glass and ambient, or room, temperature. However, mismatch in glass coefficients of thermal expansion, as normally measured over the range of 25°-300° C., tends to follow that of the longer interval. Accordingly, such coefficient values have been used as a guide in identifying useful cladding compositions. My search then has been for a family of glasses having the several properties required for cladding purposes, and also having lower thermal expansion coefficients than heretofore available in such glasses.

A basic consideration is the ability to simultaneously draw two glasses directly from melts as clad fiber having a numerical aperture equal to or approximating one. Such a drawing process is sometimes referred to as a double crucible, or double orifice, drawing process. It is referred to, for example, in connection with resistor cane production in U.S. Pat. No. 3,437,974 (Spiegler). It is illustrated in U.S. Pat. No. 3,209,641 (Upton), and, in somewhat more complex, double clad tubing production, in U.S. Pat. No. 4,023,953 (Megles, Jr. et al.).

Briefly, in simple form, a core glass may be melted in, or transferred in molten form to, a cylindrical chamber having a drawing orifice. This chamber is surrounded by a second, concentric, cylindrical, chamber wall spaced from the first chamber. The cladding glass is melted in, or transferred to, this second chamber which also has a drawing orifice concentric with and surrounding the first orifice. The two glasses are allowed to flow out simultaneously and unite to form the desired clad cane as drawn.

My present invention is based on discovery of a family of fluoroborosilicate cladding glasses that meet the several requirements for producing strong clad fibers. These cladding glasses have coefficients of thermal expansion not over $80 \times 10^{-7}/°C.$, and preferably less than $70 \times 10^{-7}/°C.$ Further, they have temperature-viscosity characteristics that enable them to be successfully drawn in conjunction with lead silicate core glasses.

The lead silicate core glasses generally have refractive indices of about 1.76-1.78 and thermal expansion coefficients on the order of at least $75 \times 10^{-7}/°C.$, and ranging up to about $100 \times 10^{-7}/°C.$ Glasses having particular utility for present redraw purposes consist essentially of, in weight percent, 63-72% PbO, 26-32% $SiO_2$, 0-6% BaO, the PbO+BaO content being 66-72%, 0-2% CaO, the BaO+CaO being 0-6%, 0-5% $Al_2O_3$, 0-5% $Na_2O$, 0-3% $K_2O$ and 0-2% $As_2O_3$.

My new cladding glasses must meet several requirements. Initially, as previously indicated, a numerical aperture of one requires a large difference in the refractive indices of the core and cladding glasses. For example, a core glass of about 1.775 is required with a cladding glass having an index of about 1.465. In the case of minimum difference, that is indices of 1.76 (core glass) and 1.465 (cladding glass), the N.A. will be about 0.975.

The liquidus of the cladding glass should be at least below the drawing temperature of the core glass. Further, the viscosities of the core and cladding glasses should be reasonably close at the forming or drawing temperature. This proximity of viscosity values also facilitates subsequent fusion of fibers into bundles for redraw by avoiding the need for an intermediate glass or flux. Thus, it is generally desirable that the two glasses having viscosities of about $10^4-10^6$ poises at the drawing temperature, preferably about $10^5$ poises.

The glasses must be generally compatible with each other during drawing. Thus, they should not be susceptible to devitrification, bubble formation, or other type of interaction at their interface.

Finally, as discussed earlier, it is generally desirable that the cladding glass have a coefficient of thermal expansion below that of the core glass. Preferably, the coefficient of the cladding glass is at least $10 \times 10^{-7}/°C.$ less than that of the core glass.

More specifically, my new cladding glasses will have a refractive index not over about 1.465, a softening point under about 600° C., a viscosity of $10^4-10^6$ poises at drawing temperature, and a coefficient of thermal expansion not over about $80 \times 10^{-7}/°C.$, and preferably under $70 \times 10^{-7}/°C.$ My new family of glasses providing these characteristics consist essentially of, in weight percent calculated from the batch, 48-55% $SiO_2$, 7-12% $Al_2O_3$, over 23%, but not over 28% $B_2O_3$, 7-9% $Na_2O$, 0-2.5% $K_2O$ and 6-10% F. (as batched). Some fluorine is inevitably lost in melting so that analyzed values are about 4-8% F.

These composition limits on the several glass components should be observed with reasonable care. Thus, at least 4% fluorine, by analysis, is required to maintain a softening point below 600° C. and a low refractive index below 1.465. In general, more than about 8% is undesirable because of an adverse effect on thermal expansion coefficient. In order to provide analyzed contents of 4-8% F., about 6-10% should be incorporated in the glass batch. It will be appreciated, of course, that the amount lost by volatilization will depend somewhat on other constituents, and on melting conditions.

$Al_2O_3$ apparently serves to stabilize the fluorine and maintain it in the glass during melting. Substitution of either $Al_2O_3$ or $B_2O_3$ for $SiO_2$ has no significant effect on coefficient of thermal expansion or refractive index. An addition of either oxide tends to soften the glass within the indicated ranges, and determines the lower limits for the ranges.

The effect of changing alkali metal oxide content is significant. Glasses containing less than about 7% $Na_2O$ tend to be too hard, that is have a softening point in excess of 600° C. On the other hand, over about 9% $Na_2O$ unduly increases the refractive index. The general effect of replacing $Na_2O$ by an equivalent amount of $K_2O$ is to increase the softening point and the coefficient of thermal expansion, while slightly decreasing the refractive index. The presence of either lithia ($Li_2O$) or the alkaline earth metal oxides (RO) tends to create an opal glass, and hence should be avoided.

Either antimony or arsenic oxide may be added for fining purposes. In minor amounts, these oxides have little or no effect on glass properties.

SPECIFIC EXAMPLES

The invention is further illustrated with reference to compositions for several cladding glasses as set forth in TABLE I. The compositions are given on an oxide basis, with fluorine being shown separately on an elemental basis. However, it will be appreciated that the fluorine is incorporated in a glass batch as fluorides, e.g., aluminum and/or potassium fluorides, and enters the glass structure in place of oxygen. The compositions are given in parts by weight. Since each composition totals approximately 100, the individual amounts may be taken as percentages by weight.

A glass batch was mixed corresponding to each composition. The batches were melted in covered platinum crucibles for four to six hours at temperatures varying from 1250°-1350° C. as required for successful melting. The melts were poured into molds to form 6"×6" (15 cm×15 cm) patties which were annealed. The patties were divided into sections and prepared for measurement of various physical properties. The observed data are also recorded in TABLE I. Ref. Ind. represents refractive index. C.T.E. represents coefficient of thermal expansion expressed in terms multiplied by $10^{-7}/°C$. Soft. Pt. represents softening point in terms of °C. The internal liquidus value for selected samples is recorded under Liq. Int. in °C.

TABLE I

|  | 1 | 2 | 3 | 4 | 5 | 6 |
|---|---|---|---|---|---|---|
| $SiO_2$ | 53.6 | 52.6 | 50.6 | 51.6 | 51.6 | 48.6 |
| $Na_2O$ | 8.2 | 8.2 | 8.2 | 8.2 | 8.2 | 8.2 |
| $K_2O$ | — | — | — | — | — | 2.0 |
| $Al_2O_3$ | 8.0 | 8.0 | 8.0 | 8.0 | 10.0 | 8.0 |
| $B_2O_3$ | 24.2 | 24.2 | 24.2 | 26.2 | 24.2 | 24.2 |
| F | 6.0 | 7.0 | 9.0 | 7.0 | 6.0 | 9.0 |
| F (analyzed) | 4.3 | 4.4 | 4.6 | 4.2 | 4.3 | 5.1 |
| Soft Pt. | 591 | 590 | 584 | 579 | 586 | 568 |
| CTE ($\times 10^{-7}/°C$) | 66 | 65 | 67 | 66 | 67 | 77 |
| Ref. Ind. | 1.462 | 1.464 | 1.462 | 1.465 | 1.465 | 1.465 |
| Liq. Int. | 707 |  | 708 |  |  | 715 |

By way of illustrating how small deviations in composition outside the prescribed limits can alter properties, compositions and properties for six additional glasses are shown in TABLE II below.

TABLE II

|  | 7 | 8 | 9 | 10 | 11 | 12 |
|---|---|---|---|---|---|---|
| $SiO_2$ | 57.6 | 55.6 | 49.6 | 55.6 | 55.6 | 51.6 |
| $Na_2O$ | 8.2 | 8.2 | 12.2 | 8.2 | 6.2 | 10.2 |
| $Al_2O_3$ | 4.0 | 6.0 | 8.0 | 8.0 | 8.0 | 8.0 |
| $B_2O_3$ | 24.2 | 24.2 | 24.2 | 22.2 | 24.2 | 24.2 |
| F | 6.0 | 6.0 | 7.0 | 7.0 | 7.0 | 7.0 |
| F (analyzed) | 4.2 | 4.2 | 4.9 | 4.4 | 3.9 | 4.7 |
| Soft. Pt. | 652 | 615 | 575 | 602 | 610 | 579 |
| CTE ($\times 10^{-7}/°C$) | 62 | 63 | 82 | 65 | 58 | 73 |
| Ref. Ind. | 1.465 | 1.465 | 1.477 | 1.464 | 1.460 | 1.469 |

TABLE III sets forth compositions for four glasses (Examples 13-16) that are particularly suitable for core glasses, as well as for two glasses (Examples 17 and 18) that are not suitable. Also included are physical properties, as in TABLES I and II, plus annealing point (Ann.) and strain point (Str.) in °C. and Internal Liquidus (Int. Liq.) also in °C.

There is a tendency for some reduction to metallic lead to occur in these glasses. Since this tends to lower the refractive index, it is desirable to maintain oxidizing conditions during melting, for example, by using nitrates as batch materials.

TABLE III

|  | 13 | 14 | 15 | 16 | 17 | 18 |
|---|---|---|---|---|---|---|
| $SiO_2$ | 30.5 | 29.4 | 28.7 | 28.3 | 27.0 | 27.5 |
| PbO | 63.7 | 64.6 | 65.5 | 64.3 | 62.6 | 63.7 |
| BaO | 5.6 | 1.8 | 5.4 | 3.1 | 5.5 | 5.6 |
| CaO | — | — | — | 0.9 | — | 2.8 |
| $Na_2O$ | — | 1.6 | — | 1.6 | — | — |
| $K_2O$ | — | 2.4 | — | 1.6 | 4.6 | — |
| $As_2O_3$ | 0.2 | 0.2 | 0.2 | 0.2 | 0.2 | 0.2 |
| Soft (°C.) | 605 | 535 | 596 | 546 | 548 | 620 |
| CTE ($\times 10^{-7}/°C$) | 75 | 99 | 80 | 94 | 104 | 82 |
| R.I. | 1.77 | 1.770 | 1.775 | 1.765 | 1.770 | 1.785 |
| Int. Liq. (°C.) | — | 720 | 729 | 707 | 819 | 744 |

The high $K_2O$ content in Example 17, and the high CaO content in Example 18, appear to sharply increase the liquidus temperature. This interfered with drawing clad fiber which was produced by melting core and cladding glasses in a double crucible apparatus generally similar to that illustrated in the Upton patent mentioned earlier.

The invention is further described with reference to the single FIGURE of the drawing, a graphical representation of the viscosity-temperature curves for a preferred combination of cladding and core glasses. Glass viscosity is plotted in poises along the vertical axis on a logarithmic scale. Temperature in °C. is plotted along the horizontal axis on a regular scale.

Curve A is based on data for a cladding glass having the composition of Example 1 in TABLE I. Curve B is based on data for a core glass having the composition of Example 15 in TABLE III. The internal liquidus for each glass is identified on its curve. These values are well below the forming temperature which is somewhat above 800° C.

The numerical aperture provided by this combination of glasses is 1.005. The mismatch in coefficients of expansion (25° to 300° C.) is $14 \times 10^{-7}/°C$. A clad fiber drawn from these glasses had an unabraded modulus of rupture of 21.5±4.5 ksi. Examination by microprobe and by optical microscopy revealed no evidence of diffusion at the interface, nor of reaction or defect formation.

Clad fibers, composed of these glasses, may readily be processed, as described earlier, to form inverters for night vision devices. Thus, a bundle of fibers may be heated, drawn, rebundled, drawn again, bundled and fused to form a block for cutting and polishing. The resulting body will be strong, have good transmission characteristics and show no signs of reaction or defect formation during the thermal treatment.

I claim:

1. A fluoroborosilicate cladding glass having a composition, in weight percent, consisting essentially of 48–55% $SiO_2$, 7–12% $Al_2O_3$, over 23%, but not over 28% $B_2O_3$, 7–9% $Na_2O$, 0–2.5% $K_2O$ and by analysis 4–8% F., the glass having a refractive index not over about 1.465 and a coefficient of thermal expansion of not over $80 \times 10^{-7}/°C$.

2. A fluoroborosilicate cladding glass in accordance with claim 1 essentially free of $Li_2O$ and alkaline earth metal oxides.

3. A fluoroborosilicate cladding glass in accordance with claim 1 consisting essentially of 53.6% $SiO_2$, 8.0% $Al_2O_3$, 24.2 $B_2O_3$, 8.2% $Na_2O$ and 4.3 F.

4. A clad glass fiber having a numerical aperture approximating one, and being composed of a fluoroborosilicate cladding glass, wherein the cladding glass composition consists essentially, in percent by weight of 48–55% $SiO_2$, 7–12% $Al_2O_3$, over 23% but not over 28% $B_2O_3$, 7–9% $Na_2O$, 0–2.5% $K_2O$, and 4 analyzed F. and a lead silicate core glass, the cladding glass having a coefficient of thermal expansion not over $80 \times 10^{-7}/°C$., the coefficient of thermal expansion of the cladding glass being less than that of the core glass and the coefficient of thermal expansion of the core glass being at least $75 \times 10^{-7}/°C$.

5. A clad glass fiber in accordance with claim 4 wherein the coefficient of thermal expansion of the cladding glass is at least $10 \times 10^{-7}/°C$. lower than that of the core glass.

6. A clad glass fiber in accordance with claim 4 wherein the core glass has a composition consisting essentially of, in percent by weight, 63–72% PbO, 26–32% $SiO_2$, 0–2% CaO, 0–6% BaO, the total content of PbO+BaO being 66–72% and the BaO+CaO being 0–6%, 0–5% $Al_2O_3$, 0–5% $Na_2O$ and 0–3% $K_2O$.

7. A clad glass fiber in accordance with claim 4 wherein the core glass has a refractive index of 1.76–1.78.

8. A plurality of clad glass fibers a plurality of clad glass fibers bonded together in a bundle, each clad glass fiber being composed of a core glass and a cladding glass, the numerical aperture of the clad fiber approximating one, and the cladding glass having a composition, in percent by weight, consisting essentially of 48–55% $SiO_2$, 7–12% $Al_2O_3$, over 23%, but not over 28% $B_2O_3$, 7–9% $Na_2O$, 0–2.5% $K_2O$ and containing by analysis 4–8% F.

9. A night vision device in accordance with claim 8 wherein the cladding glass is essentially free of alkaline earth metal oxides and $Li_2O$.

10. A night vision device in accordance with claim 8 wherein the core glass composition consists essentially of 63–72% PbO, 26–32% $SiO_2$, 0–2% CaO, 0–6% BaO, the PbO+BaO being 66–72%, the CaO+BaO being 0–6%, 0–5% $Al_2O_3$, 0–5% $Na_2O$ and 0–3% $K_2O$.

11. A night vision device in accordance with claim 8 wherein the coefficient of thermal expansion of the cladding glass is at least $10 \times 10^{-7}/°C$. units lower than that of the core glass.

12. In a night vision device comprising a plurality of clad glass fibers bonded together in a bundle, each clad glass fiber being composed of a core glass and a cladding glass, the improvement wherein the cladding glass has a composition in weight percent consisting essentially of 48–55% $SiO_2$, 7–12% $Al_2O_3$, over 23% but not over 28% $B_2O_3$, 7–9% $Na_2O$, 0–2.5% $K_2O$, and 4–8% analyzed F.

* * * * *